United States Patent [19]

Dacquet

[11] Patent Number: 4,752,392
[45] Date of Patent: Jun. 21, 1988

[54] FILTRATION APPARATUS HAVING A PLURALITY OF FILTRATION BEDS

[75] Inventor: Philippe Dacquet, Paris, France
[73] Assignee: Bectra S.A., France
[21] Appl. No.: 947,884
[22] Filed: Dec. 30, 1986

[30] Foreign Application Priority Data

Dec. 30, 1985 [FR] France ............... 85 19434

[51] Int. Cl.⁴ ................... B01D 23/16; B01D 23/26
[52] U.S. Cl. ......................... 210/202; 210/203;
    210/206; 210/207; 210/268; 210/275; 210/519
[58] Field of Search ............... 210/203, 265, 108, 205,
    210/206, 248, 275, 277, 278, 333.01, 519, 202, 207

[56] References Cited

U.S. PATENT DOCUMENTS

| | | | |
|---|---|---|---|
| 3,111,486 | 11/1963 | Soriente | 210/275 |
| 3,473,661 | 10/1969 | Duff | 210/108 X |
| 3,831,755 | 8/1974 | Goodman et al. | 210/108 |

FOREIGN PATENT DOCUMENTS

| | | |
|---|---|---|
| 1811507 | 7/1969 | Fed. Rep. of Germany . |
| 2143728 | 2/1973 | France . |

*Primary Examiner*—Richard V. Fisher
*Assistant Examiner*—Richard D. Jordan
*Attorney, Agent, or Firm*—Bacon & Thomas

[57] ABSTRACT

The present invention relates to a filtration apparatus composed of: a container comprising a central well and a number of radial individual chambers, each of said chambers comprising: a filtration bed placed on a plate, said plate defining with the bottom of the container an evacuation chamber; an open gullet admitting the water, and an aperture situated towards the top end of the well and connecting said chamber with said well, each well being equipped at its base with a discharge pipe and said container comprising at its base a discharge pipe for the pure water.

12 Claims, 4 Drawing Sheets

FILTRATION APPARATUS HAVING A PLURALITY OF FILTRATION BEDS

BACKGROUND OF THE INVENTION

1. Field of the Invention

The present invention relates to a device for purifying water.

It is known that, in general, natural water has to be purified before being suitable for human consumption. For certain types of waters, this purification can be obtained with a simple filtration through an appropriate filter (such as a bed of sand, or similar), but it may also require a prior treatment consisting in flocculating the main impurities followed by a clarification to separate the obtained flocks from the pre-purified water which will be subsequently treated by filtration.

2. Description of the Related Art

In a number of countries or remote areas, the natural water which is available is more or less pure and is treated by using filtration processes and devices such as those described in DE No. 1 811 507 (UNION TANK CAR CO.) and FR No. 2 143 728 (ECODYNE CORP.), and working on reverse flow cleaning cycles. Such processes however require a strong energy (such as electricity) to operate the pumps, the mixers, etc., and these types of energies are not available everywhere. It is therefore desirable to find a water purifying apparatus which, with a small amount of energy only, or even with only the pressure of the used water, will enable the preparation of drinking water; and this is precisely the object of the present invention.

SUMMARY OF THE INVENTION

The device according to the invention comprises an apparatus for purifying, by filtration, a low-contaminated water, or a prepurified water; if necessary, said apparatus is preceded by a prepurifying apparatus, using the flocculating-clarifying technique, supplying a pre-purified water to said filtering apparatus.

The filtration apparatus according to the invention used in the treatment of low-contaminated water or of pre-purified water, is characterized in that it is constituted of:

a container of generally cylindrical shape formed of an external wall, a bottom, and optionally, an upper lid, said container comprising a central well and a number of individual chambers limited by vertical radial walls disposed between said central well and the outer wall of the container, each of said chambers comprising:

- a filtration bed (preferably a bed of sand) disposed on a plate equipped with nozzle members, said plate defining with the bottom of the container an evacuation chamber which is in communication with the corresponding evacuation chambers of the adjacent individual chambers,
- an open gullet for admitting the water to be purified and, when the filtration bed is washed, for removing the residues, and
- an aperture situated close to the top of said well and placing each of said chambers in communication with the well,
  - said well being equipped at its base with an outlet tube, and
  - said container comprising at its base, and on its outer wall, an outlet pipe for the pure water coming from said evacuation chambers.

The apparatus according to the invention is further equipped on its various inlet and outlet pipes, with a number of valves generally operated by hand, and which are necessary for said filtration apparatus to work according to the process to be described later.

Advantageously:

the gullets of said container are supplied from a distribution chamber constituted of a central cylinder, supplied with water to be purified, said cylinder being open and surrounded by a ring wherefrom start all the various pipes supplying the gullets, each of said evacuation chambers is provided with a pipe admitting water under pressure and permitting, if necessary, temporary and efficient stirring of the filtration beds.

The invention will be more readily understood on reading the following description of an embodiment given by way of example and non-restrictively, with reference to the accompanying drawings, in which:

DESCRIPTION OF THE PREFERRED EMBODIMENTS

Figure 1:
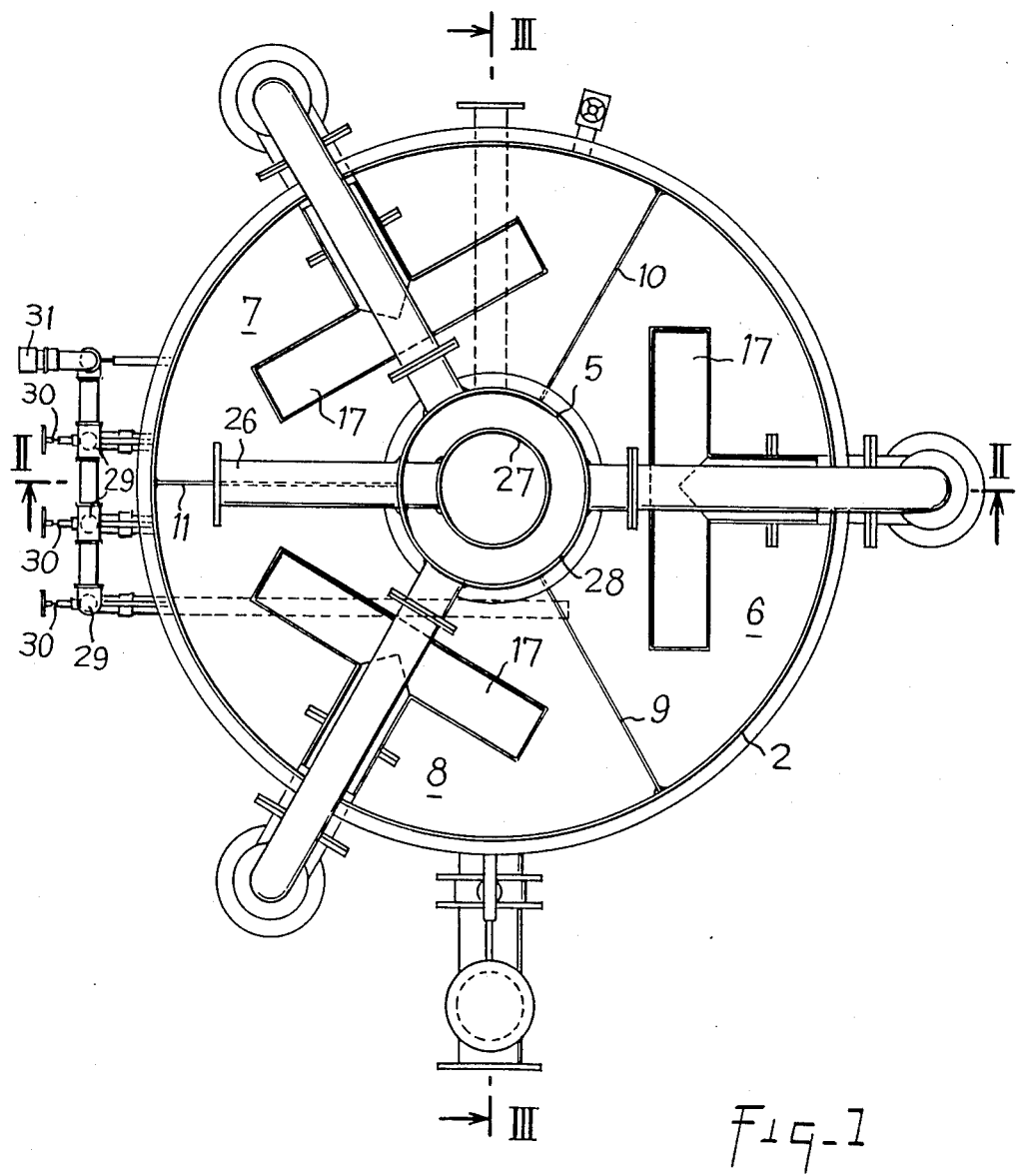
FIG. 1 is a plan view of an apparatus comprising three individual chambers.

Referring now to these Figures, these show:

in 1, the cylindrical shape container(this is a cylinder of circular section and vertical generatrices); said container is formed of a lateral outer wall 2, of a bottom 3 and optionally, a lid 4 preventing the water under treatment from being contaminated.

the container comprises a central well 5 and a number of individual chambers 6, 7 and 8, defined by radial walls 9, 10 and 11, disposed between the wall of the central well and the outer lateral wall of the container, each of said individual chambers comprises a filtration bed 12 resting on a plate 13 equipped with nozzle members 14; each plate 13 delimits an evacuation chamber 15 which communicates, via apertures 16, with the next evacuation chamber; each of said individual chambers further comprises an open gullet 17; said gullet is fed with water to be treated from the pipe 18 which is equipped with a valve 19; said gullet is also in communication with an outlet pipe 20 via a valve 21; each individual chamber is provided, close to the top part of the wall separating said chamber from the central well, with an aperture 22;

the central well is equipped at its lower part with an outlet pipe 23, finally, the container is provided at its base (i.e. at the level of the evacuation chambers) with an outlet pipe 24 equipped with a valve 25.

Figure 2:
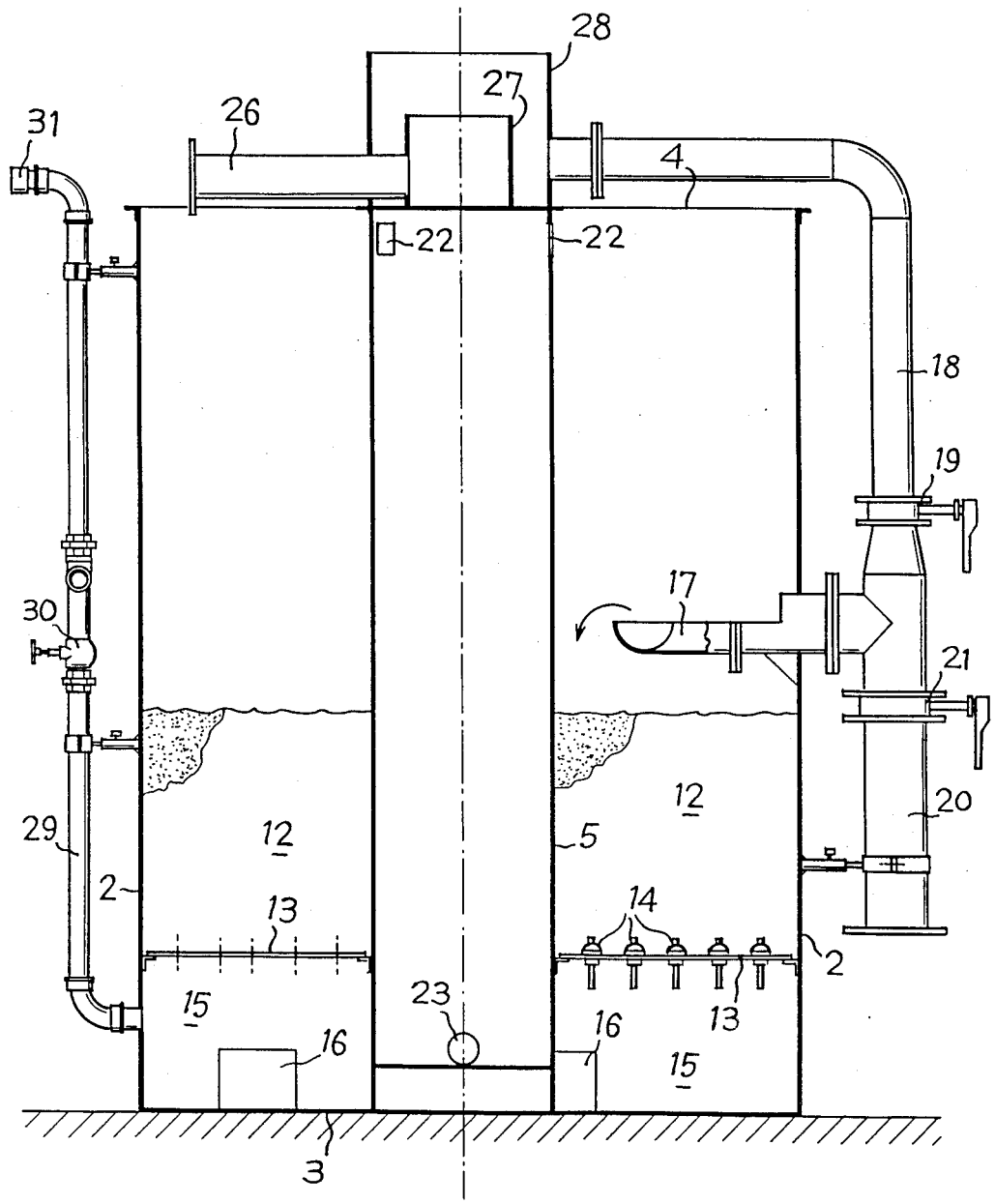
FIG. 2 is a cross-section along line II—II of FIG. 1.
Figure 3:
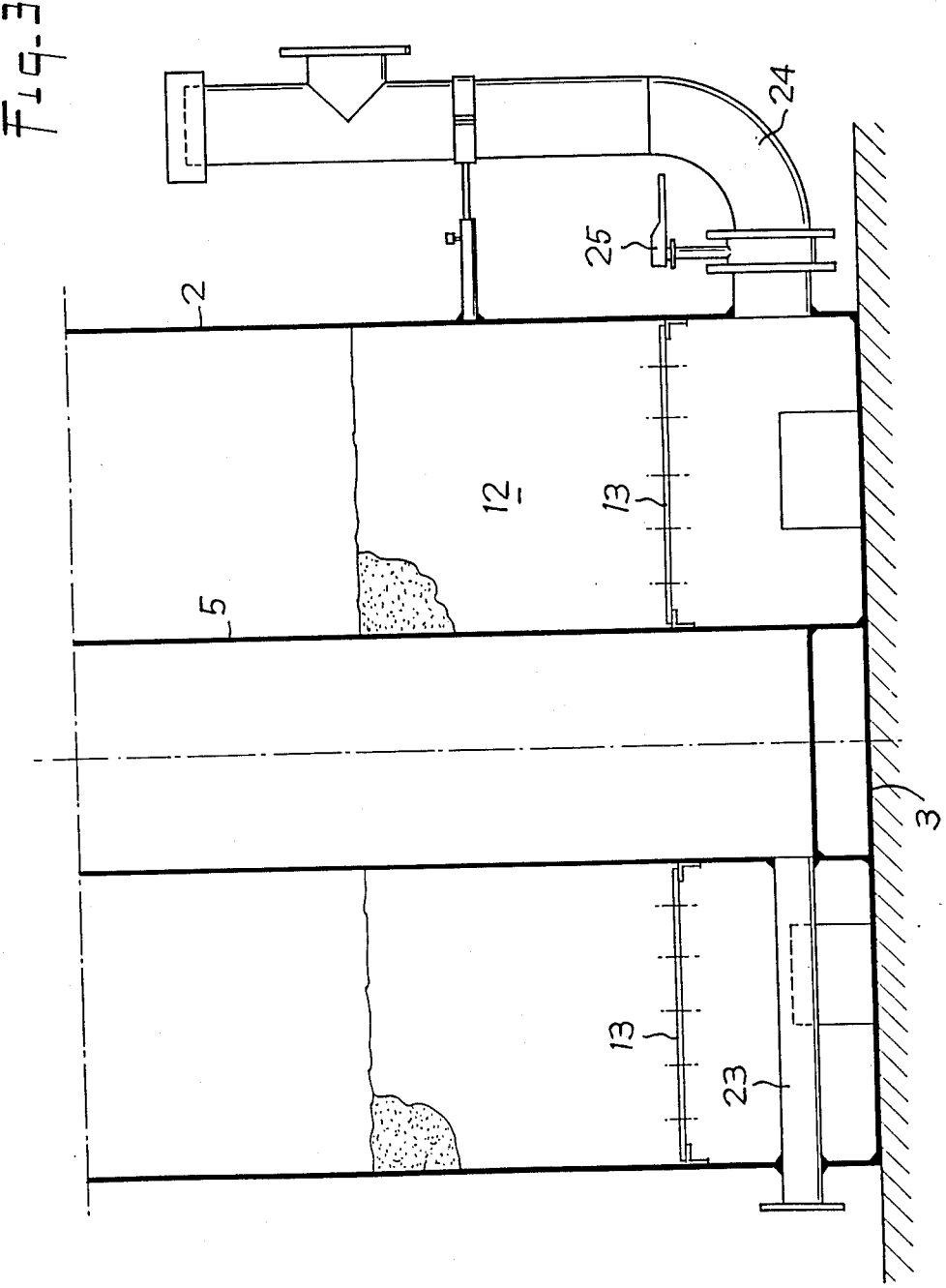
FIG. 3 is a cross-section along line III—III of FIG. 1.

In the apparatus illustrated in FIGS. 1, 2 and 3 the supply in low-contaminated water or in pre-treated water is ensured from pipe 26 issuing into an open chamber 27, which latter ensures the supply, by overflow, of each of said pipes 18 opening out onto the periphery of a chamber 28 surrounding chamber 27.

It is also noted that each of said evacuation chambers is connected via pipes 29 equipped with valves 30 with a water intake 31.

The operation of the apparatus according to the invention is very simple:

the low-contaminated water or the pre-purified water is admitted through pipe 26, is distributed in the three pipes 18 and flows through the gullets 17 (valve 19 being open and valve 21 being closed) over the filtration beds 12; the filtered water, coming out of nozzle members 14 flows into evacuation chambers 15 and comes out through pipe 24 (valve 25 being open);

as the water is progressively filtered, the filtration beds clog up and the water will gradually rise in the individual chambers; when one of the beds is deemed to be clogged up (namely when it no longer ensures an efficient rate of filtration), the water in the corresponding individual chamber will have filled said chamber and will flow out, through aperture 22, into the central well and, from there, into outlet pipe 23; the workers, operating the installation, will be warned of the clogging up of the filtration bed by the discharge of water through pipe 23, then they can proceed to a cleaning of the clogged up bed using the water coming from the other two chambers;

supposing that the bed of chamber 6 is clogged up, then, valve 19 is closed and valve 21 is open, which causes the immediate discharge of the water contained in said chamber above the level of the gullet; valve 25 is then closed; at that moment, the water coming from the evacuation chambers corresponding to individual chambers 7 and 8 goes up through the nozzle members and into the filtration bed of the individual chamber 6 and is evacuated through the gullet of said chamber 6, the impurities being carried away by said ascending water flow;

moreover, in certain cases, such as when at least in one of said individual chambers, the filtration bed is too clogged up to be cleaned by the above-described process, then a flow of pressurized water can be sent through the evacuation chamber or chambers, in order to thoroughly clean the filter or filters.

It is obvious that the apparatus according to the invention requires no outside energy supply; it works very well if it is only supplied with water under a relative pressure, between 1 and 6 bars. The total volume of an apparatus according to the invention is very variable; said volume can be adapted to treat, depending on the models of apparatus used, between 10 and 100 m$^3$/hr of low-contaminated water or pre-purified water.

The present invention also relates to an apparatus for pre-purifying contaminated water, said apparatus being placed upstream of the above-described apparatus and thus supplying said apparatus with pre-purified water.

The pre-purifying apparatus according to the invention is characterized in that it is composed of a cylindrical shape vertical container, formed of a lateral wall and of a bottom, and comprising, along its axis, a discharge overflow, the lower part of which goes through the bottom of the container, whereas the upper part, preferably funnel-shaped, is situated at a "high level" of the container, said discharge overflow being encircled by an admission pipe starting at the bottom of the container and reaching to a "lower level" than said "high level" into a flotation chamber, a pre-purified water discharge pipe being situated under said "lower level" and being protected by a skirt, said container being supplied at the base of said admission pipe, with water which, having passed through a hydroejector, is filled with air and at least one chemical reagent flocculating the impurities and which, having passed through a tubular flocculator, has enabled said chemical reagent to flocculate said impurities.

The pre-purification apparatus according to the invention may also comprise:

means (such as vats) for storing said flocculating chemical or chemicals, said means being connected to said hydroejector, means permitting the variation of the water level in the container, said level being also regulated by the top level of the overflow) thus helping, if necessary, the removal of the flocks through said overflow, and means for removing any sludges depositing on the bottom of the container.

Figure 4:
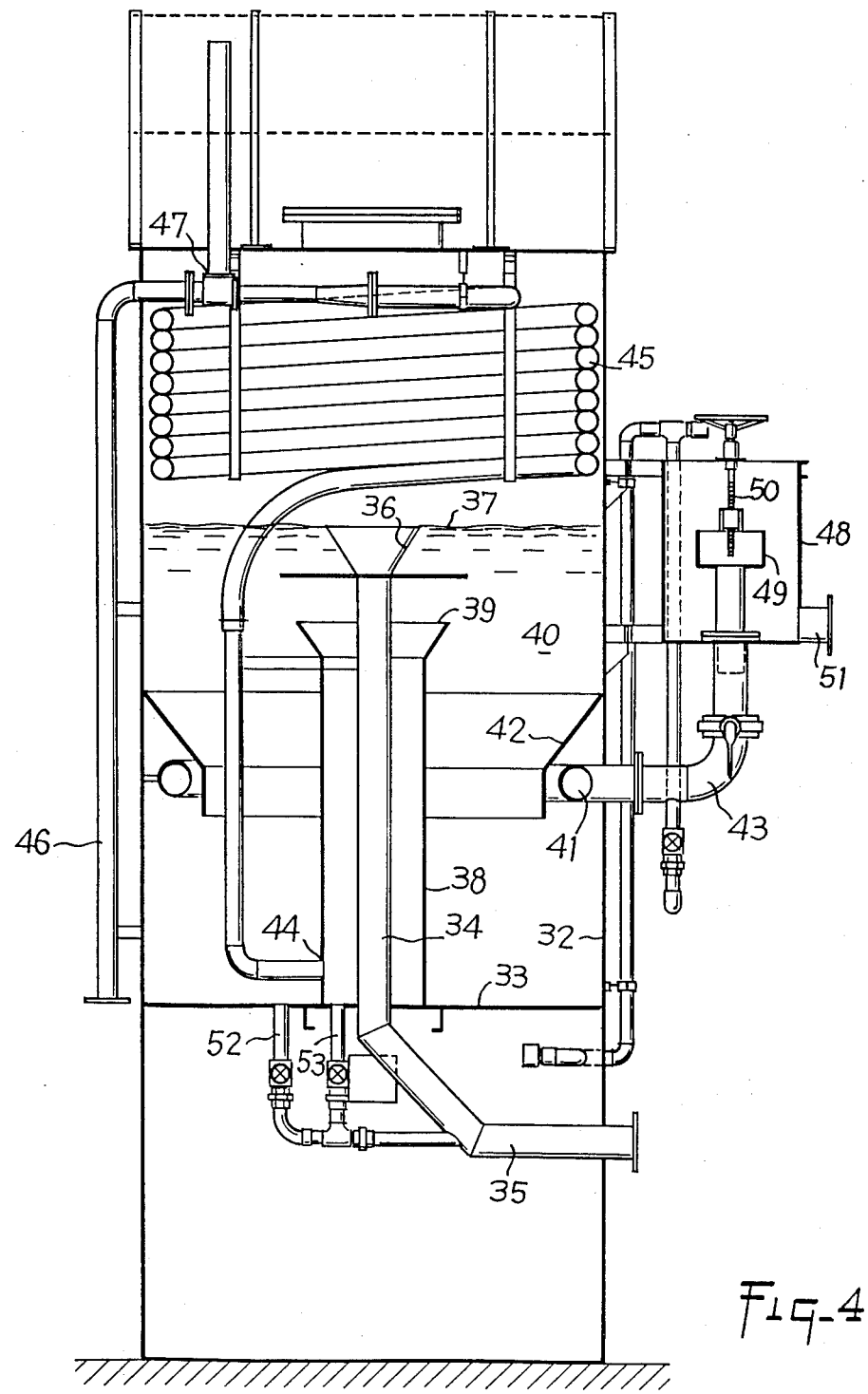
FIG. 4 is a cross-sectional representation of a prepurification flocculator used in combination with the apparatus shown in FIGS. 1—3.

Said pre-purification apparatus will be more readily understood on reading the following description with reference to FIG. 4 which unrestrictively and diagrammatically illustrates a cross-section of the apparatus according to the invention.

Said FIG. 4 shows:

in 32, the cylindrical side wall and in 33, the bottom of the container, in 34, the over-flow; the lower part of said overflow goes through bottom 33 of the container and extends outwardly through pipe 35; the upper part of said overflow widens out in 36 and is situated at the top part ("high level") of the container; the level of the highly contaminated water is materialized in 37, said water flowing out through the widening out part of the overflow, the overflow 34 is surrounded over a certain height from the bottom of the container by an admission sleeve 38 which issues into 39, via a widening out part, beneath the high level of said overflow, into a flotation chamber 40; the high level 39 of said admission sleeve will be called "lower level", the pre-purified water discharge pipe is in the form of a ring 41 provided with a number of openings situated at the lower part of said ring; said ring is placed close to the side wall 32 at a lower level than said "lower level" (or opening level of the admission sleeve) and the openings provided in the ring are protected by a skirt 42 welded to the side wall 32; a bleeding pipe 43 provided on said ring ensures the effective discharge of the pre-purified water, in 44, at the base of said admission sleeve 38, is admitted the water which supplies the flocculation container; said water comes from a tubular flocculator 45 which is constituted by a serpentine, advantageously placed above said flocculation container, which latter is supplied from a contaminated water pipe 46 reaching into a hydroejector 47 into which the contaminated water is filled, first with air, and second with a number of known chemicals (such as alumina), contained in a container, on the pre-purified water outlet 43, a system 48 has been installed, which is essentially constituted of an overflow 49, the level of which is adjustable by means of a rack system 50; the pre-purified water comes out of the system 44, through pipe 51, on the bottom of the container are provided two outlets 52 and 53, equipped with valves and connected with outlet pipe 35, through which are removed any sludge that may deposit on the bottom of the container.

The pre-purifying apparatus works as follows:

The contaminated water is admitted through pipe 46 under a pressure of between 1 and 6 bars, and flows through the hydroejector 47 where it fills with chemical flocculant and air bubbles; the water thus filled flows through serpentine 45, which, as already indicated, is a tubular flocculator, i.e. a tube in which the flocks of said chemical product are formed, flocks in which a large part (at least 90%) of the impurities of the water is confined; the water containing said flocks is admitted at the base of admission sleeve 44; due to the presence of air, the flocks, which are lighter than water, will float on the surface of the water and form on said surface a layer to be removed; said layer is removed continuously through the overflow 34 into the pipe 35 and rejected outside; the water, cleared of its impurities and undergoing inside the container an extra clarification treatment, comes out through the openings of the discharge ring 40, then, via, pipe 43 and overflow 49, through pipe 51; said pipe 51 is advantageously connected with pipe 26 of the purifying apparatus illustrated in FIGS. 1, 2 and 3. Anyone skilled in the art, will understand without any further description, the part played by pipes 52, 53 and the valves provided thereon, and by the device 49-49-50 modifying the height of the water for the induced removal of the larger flocks, and how these pipes and device work.

It is obvious that the apparatus according to the invention can work without any outside energy, since it suffices that the pressure of the admitted water be higher than about 1 to 2 bars; if the pressure of the contaminated water is too low, then a pump will be needed downstream of the admission pipe 46.

Obviously the invention is not limited to the description given hereinabove, and on the contrary covers any modifications that can be brought thereto without departing from its scope.

What is claimed is:

1. A filtration apparatus for filtering water which comprises:
   (a) a container of generally cylindrical shape having an external lateral wall and a bottom wall;
   (b) a central well within the container; said well being formed from a vertically extending generally cylindrical wall within the container and said well having an outlet tube on the bottom for draining any water which enters the well;
   (c) a plurality of vertical radial walls extending from the central well wall to the external wall along the length of the container, whereby a plurality of chambers is formed in the container, each chamber being located between the central well and the external wall; each chamber being in communication with the central well by means of an opening on the top of the well, one opening being provided for each chamber whereby water which rises above said opening can overflow into the well;
   (d) a plurality of filtration beds, one bed being provided for each chamber; said beds being disposed on a horizontal plate located in the container at an elevated position above the bottom wall; said plate having a plurality of nozzle members for the passage of water therethrough;
   (e) a plurality of evacuation chambers, each of which is located at the bottom portion of each chamber below the plate; said evacuation chambers being defined by the plate, the central well wall, the radial walls, the bottom wall and the external lateral wall; each evacuation chamber being in communication with adjacent evacuation chambers by means of openings in the bottom of the vertical radial walls below the plate;
   (f) a chamber pipe connected to each chamber, each chamber pipe entering its respective chamber through the external lateral wall and each chamber pipe having an open portion within the chamber for flowing water to and from each chamber;
   (g) a water distributor means connected to each chamber pipe via a water distributor pipe and a valve for regulating the flow of water into each chamber;
   (h) a chamber outlet pipe connected to each chamber pipe via a valve for regulating the flow of water from each chamber; said chamber outlet pipe having an opening at a level whereby water can exit the chamber by gravity; and
   (i) an evacuation chamber pipe connected to the bottom of the container; said evacuation chamber pipe being in communication with an evacuation chamber and said evacuation chamber pipe being equipped with a valve.

2. The apparatus of claim 1 wherein the filter bed is sand.

3. The apparatus of claim 1 wherein the container further comprises an upper lid.

4. The apparatus of claim 1 wherein the water distributor means comprises an inlet pipe which is connected to a distribution chamber; said distribution chamber being located on the top of the container and said distribution chamber comprising a housing containing an open cylinder, said cylinder being connected to the inlet pipe and said cylinder being adapted to permit water to overflow into the housing; and said housing communicating with each water distribution pipe for bringing water to each chamber.

5. The apparatus of claim 4 wherein each chamber pipe is connected to its respective chamber at a location which is approximately midway between the top and bottom of the chamber; and each chamber pipe is generally horizontal and the opening of the chamber outlet pipe is below the chamber pipe.

6. The apparatus of claim 1 wherein each of said evacuation chambers is equipped with a pipe which is provided with a valve for admitting water under pressure into the evacuation chamber.

7. The apparatus of claim 1 which further comprises a flocculator for prefiltering the water before the water enters the water distributor, said flocculator comprising:
   (a) a generally cylindrical vertical container formed of a lateral wall and a bottom wall;
   (b) a discharge overflow inside the container, said overflow comprising a vertical overflow pipe, said pipe having a lower part which passes through the bottom of the container and a top part which terminates in an opening at an elevated portion within the container;
   (c) an admission sleeve which surrounds the overflow pipe and which extends from the bottom of the container to a point below the top part of the overflow pipe; said sleeve along with the overflow pipe defining an annular space for the passage of water therethrough upwards into the container; said sleeve terminating in a top portion having an opening which is below the top part of the overflow pipe;
   (d) a flocculator tube for flocculating impurities contained in the water and for introducing the water into the admission sleeve; said flocculator tube having an hydroejector for injecting flocculating agent and air into water within the tube; and said tube communicating with the bottom portion of the admission sleeve for the passage of the flocculated water upwards in the sleeve into the container at the top part of the sleeve; and (e) a prepurified water discharge pipe having a portion with an opening located below the top of the admission sleeve; said pipe passing through the container for discharging water therethrough; said prepurified water discharge pipe being connected to the water distributor.

8. The apparatus of claim 7 wherein the top part of the overflow pipe is in the form of a widened section with the opening being located at the widest portion thereof; and the top part of the admission sleeve is in the form of a widened section with the opening being located at the widest portion thereof.

9. The apparatus of claim 8 wherein the open portion of the prepurified water discharge pipe is in the form of a ring which surrounds the admission sleeve; said ring having a plurality of openings therein.

10. The apparatus of claim 9 which further comprises a skirt mounted within the ring for shielding the openings.

11. The apparatus of claim 10 which further comprises a first outlet on the bottom of the annular space in the admission sleeve and a second outlet on the bottom of the container, each outlet being equipped with a valve.

12. The apparatus of claim 11 which further comprises an adjustable overflow attached to the prepurified water discharge pipe at a location which is outside the container.

* * * * *